J. H. PLUMMER.
SCROLL-SAWING MACHINE.
No. 7,726. Reissued June 5, 1877.
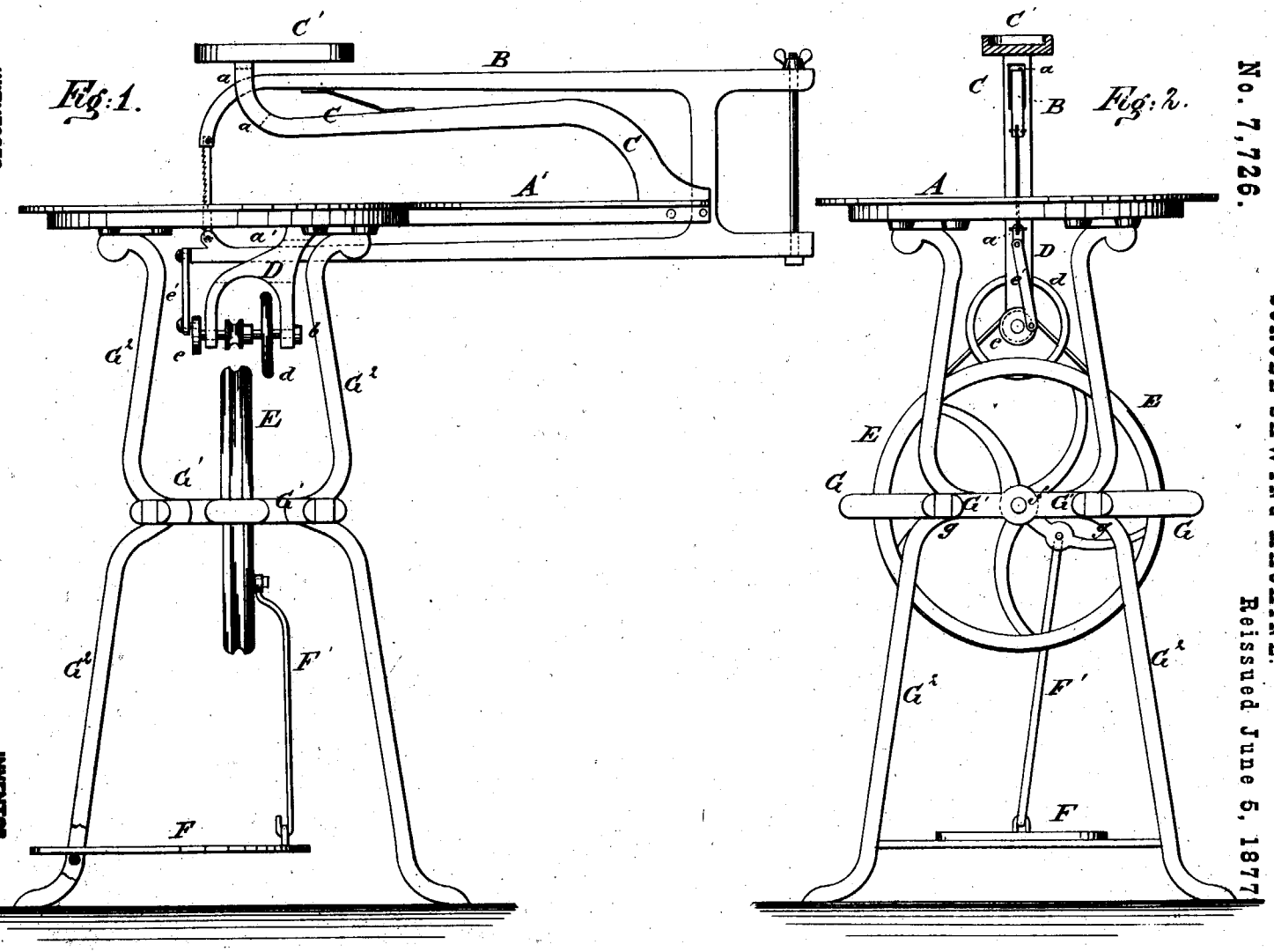
WITNESSES:
Chas. Nida.
J. H. Scarborough.
INVENTOR:
J. H. Plummer.
BY
ATTORNEYS.
N. PETERS, PHOTO-LITHOGRAPHER, WASHINGTON, D. C.

UNITED STATES PATENT OFFICE.

JEROME H. PLUMMER, OF BROOKLYN, NEW YORK.

IMPROVEMENT IN SCROLL-SAWING MACHINES.

Specification forming part of Letters Patent No. 168,920, dated October 19, 1875; reissue No. 7,726, dated June 5, 1877; application filed April 16, 1877.

DIVISION B.

*To all whom it may concern:*

Be it known that I, JEROME H. PLUMMER, of Brooklyn, in the county of Kings and State of New York, have invented a new and Improved Scroll-Sawing Machine, of which the following is a specification:

In the accompanying drawing, Figure 1 represents a side elevation, and Fig. 2 a front elevation, of my improved scroll-sawing machine.

Similar letters of reference indicate corresponding parts.

The invention relates to improvements in scroll-sawing machines, by which a convenient and easily working and adjusted machine is obtained; and it consists of a saw-table having an extension, with slotted top and bottom arms that guide the reciprocating saw-frame; and it consists also of the curved top arm, provided with a shelf for placing articles thereon.

In the drawing, A represents the table of my improved scroll-saw, which is made of suitable size and strength, and provided with a horizontal rear extension, A′, to the rear end of which the reciprocating saw-frame B is pivoted.

The saw-frame B is made of parallel arms, with a vertical connecting-piece, one arm extending above, the other below, the table, both being provided with curved front ends of steel, and with clamp-screwed jaws to hold the saw that runs in a recess of table A. The rear end of the arms of the saw-frame are provided with a connecting screw rod, for setting the saw taut in the frame.

A curved arm, C, extends from the rear end of the extension-arm A′ to a point at suitable height above the center part of the table, and terminates in a small shelf, C′, (shown in Fig. 1, and in section in Fig. 2,) for the oiler, wrench, saws, &c., which is very convenient for the ready working of the apparatus.

The top arm C has a slotted recess, *a*, at its front end, through which the upper arm of the saw-frame passes, to be steadily guided thereby. A band-spring may be interposed between the curved top arm C and the upper arm of the saw-frame, to assist the upward motion of the frame, and prevent its contact with the upper end of the guide-recess of the arm C whenever a saw breaks; or the upper end of the recess may be provided with a cushioning-spring to receive the recoil.

A curved arm, D, of shorter length than the top arm C, is securely applied to the under side of the front end of the extension-arm A′, and provided, below its point of connection, with a similarly-slotted recess, *a*′, for guiding the lower arm of saw-frame B.

The bottom arm D is extended downward, and forked in U shape, to support the revolving shaft *b* of the motion-transmitting gear of the saw. The shaft *b* is rotated by pulley-and-belt connection with a large balance-wheel, E, suitably supported, which, in turn, receives motion by foot-power, through a treadle, F, and connecting crank-rod F′ below. A small fly-wheel, *d*, of shaft *b* assists the motion of the latter, while a crank-disk, *e*, at the front end and crank-rod *e*′ form the connection with the front end of the lower arm of the saw-frame, and impart thereby reciprocating motion to the same.

The scroll-sawing machine and the operating mechanism are supported on a frame, G, of suitable construction, adapted thereto.

Having thus described my invention, I claim as new and desire to secure by Letters Patent—

1. A reciprocating saw-frame, B, combined with and pivoted to a table-extension, A′, whose slotted arms C D form a guide thereto above and below the table, as and for the purpose set forth.

2. A rear table-extention, A′, provided with a curved arm, C, supporting a shelf, C′, as and for the purpose specified.

JEROME H. PLUMMER.

Witnesses:

PAUL GOEPEL,

C. SEDGWICK.